United States Patent [19]
Bawolek

[11] Patent Number: 6,055,095
[45] Date of Patent: Apr. 25, 2000

[54] MICROSCOPE WITH INFRARED IMAGING

[75] Inventor: Edward J. Bawolek, Chandler, Ariz.

[73] Assignee: Intel Corporation, Santa Clara, Calif.

[21] Appl. No.: 09/364,142

[22] Filed: Jul. 30, 1999

[51] Int. Cl.[7] .......................... G02B 21/00; G02B 21/06; H04N 7/18

[52] U.S. Cl. .................. 359/350; 359/369; 359/388; 250/332; 250/578.1; 348/79

[58] Field of Search ..................... 359/350, 351, 359/355, 356, 369, 388, 389; 250/578.1, 330, 331, 332, 333, 559.07, 559.08; 348/78, 79

[56] References Cited

U.S. PATENT DOCUMENTS

| | | | |
|---|---|---|---|
| 4,852,985 | 8/1989 | Fujihara et al. ...................... | 359/389 |
| 5,552,716 | 9/1996 | Takahashi et al. ...................... | 324/753 |
| 5,576,074 | 11/1996 | Weigel et al. .......................... | 427/559 |
| 5,754,335 | 5/1998 | Takagi et al. .......................... | 359/368 |
| 5,851,905 | 12/1998 | McIntosh et al. ...................... | 438/492 |
| 5,946,131 | 8/1999 | Wells et al. ............................. | 359/350 |
| 5,974,069 | 10/1999 | Tanaka et al. ........................... | 372/46 |

FOREIGN PATENT DOCUMENTS

| | | | |
|---|---|---|---|
| 04336445 | 11/1992 | Japan .................................... | 359/350 |

*Primary Examiner*—Jon Henry
*Attorney, Agent, or Firm*—Trop, Pruner & Hu, P.C.

[57] ABSTRACT

A microscope enables selective illumination using infrared or visible spectrum light. The image captured by a sensor array within the microscope may be displayed on a computer display. Some objects appear differently when exposed to infrared as opposed to visible radiation.

9 Claims, 2 Drawing Sheets

MICROSCOPE WITH INFRARED IMAGING

BACKGROUND

This invention relates generally to microscopes with imaging capabilities. Such microscopes may be utilized in conjunction with computers to provide enlarged images of small objects.

The X3 digital video microscope by Intel Corporation and Mattel uses a digital imaging device to provide a magnified color image of an object viewable on the display of a computer system. This product may be used by children to view enlarged images of objects and to transmit those images using electronic mail. Once the image is electronically captured, alteration of the image may also be possible using well known software.

Thus, microscopes of this type provide an educational and entertaining toy for children. They allow children to learn more about computers and at the same time to learn more about the objects being imaged.

In view of the entertainment and educational opportunities afforded by microscopes of this type, there is a continuing interest in more advanced devices which provide further educational and entertainment opportunities.

SUMMARY

In accordance with one aspect, a microscope may include an imaging array. A first light source for the microscope is adapted to selectively produce visible light and a second light source is adapted to selectively produce infrared light.

DETAILED DESCRIPTION

Figure 1:
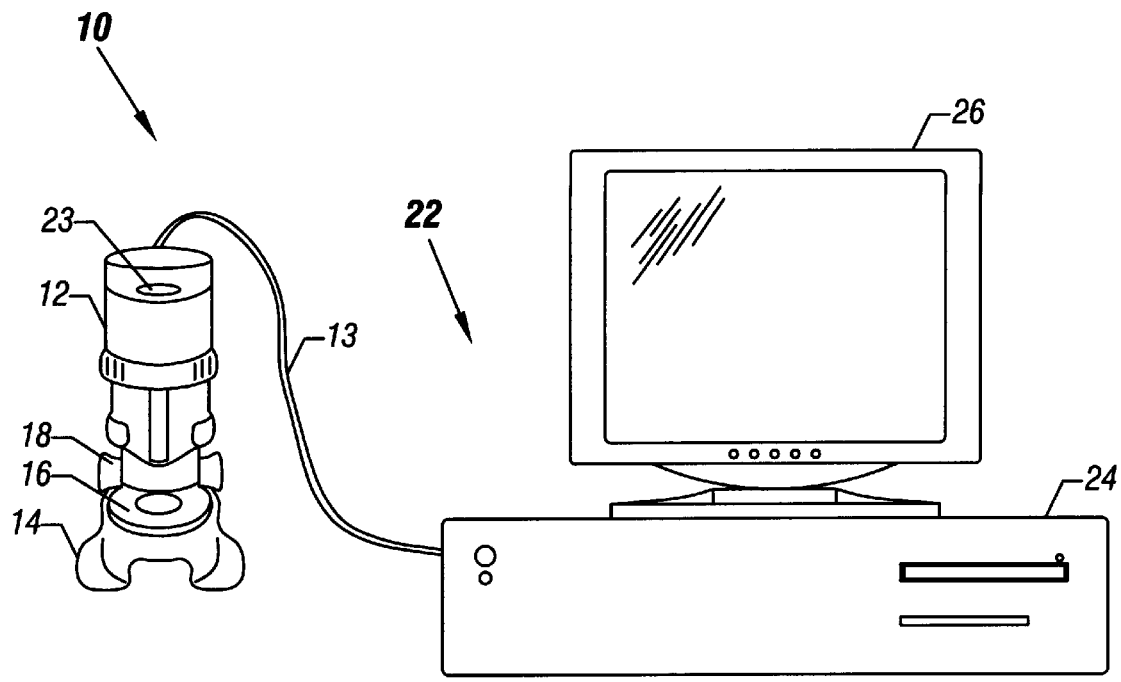
FIG. 1 is a block diagram of one embodiment of the present invention coupled to a computer system.

Referring to FIG. 1, a computer system 10 may include an microscopic imaging device 12 and a computer 22 including a housing 24 and a display 26. The microscope 12 may be coupled to the computer system 22 by a cable 13 which may provide serial data from the microscope 12 to the computer system 22. In this way, data captured by the microscope 12 may be displayed on the display 26 of the computer 22.

Figure 2:
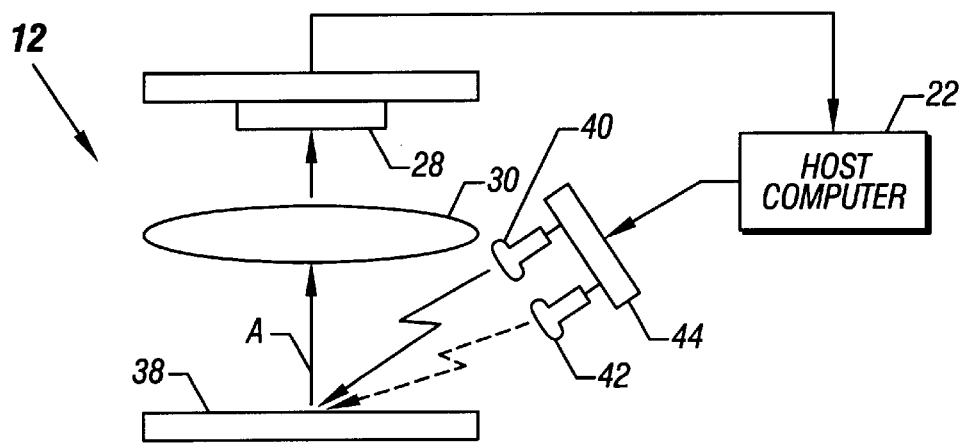
FIG. 2 is a schematic diagram of the microscope depicted in FIG. 1.

Turning now to FIG. 2, the microscope 12 may include an imaging sensor 28 which may be a complementary metal oxide semiconductor (CMOS) imaging sensor in one embodiment of the present invention. The sensor 28 may also be a charge coupled device (CCD) imaging sensor in another embodiment of the present invention. In some embodiments, the imaging sensor 28 may capture a digital representation of an object 38 which may be positioned in the sample holder 16 of the microscope 12. A lens 30 may develop an image for capture by the imaging sensor 28. The microscope may be maintained in an upright orientation using a base 14.

Some objects such as polymers and biological specimens such as leaves exhibit different optical properties in the infrared portion of the spectrum. Thus, the same object may have a different appearance as captured by the imaging array 28 and as displayed on the display 26 when viewed under infrared versus visible spectrum light.

Typically, an imaging sensor 28 includes a color filter array (CFA) material. The inventor of the present invention has determined that such color filter array materials are readily transparent to both infrared and visible spectrum light. Thus, the imaging sensor 28 works with both light spectra. In particular, the quantum efficiency of silicon sensors is sufficient in both the infrared and visible spectrums. By providing a high efficiency infrared source, given high transmittance by the color filter array of the infrared light, a silicon imaging sensor is adequate for infrared imaging capabilities. Thus, the combined effect of the improved color filter array transmittance and the reduced quantum efficiency is such that infrared imaging by the same sensor used for visible imaging is feasible.

A pair of separate light sources 40, 42 may be coupled to the computer 22 through an interface 44. The light source 42 may be a relatively pure source of infrared light. The light source 40 may be a relatively pure white light source. The computer 22, under user command, may select one of the light sources 40 or 42 to illuminate the object 38 in the sample holder 16.

The white light source 40 may illuminate the object 38 with white light. The white light is reflected off the object in the direction of the arrow A and is captured by the imaging array 28. The array 28 sends a digital representation of the information to the host computer 22.

The user may provide an input signal to the host computer 22 to select a desired light source for illuminating the object. That selection may be passed from the computer 22 to the interface 44 to operate the appropriate light source 40 or 42. Alternatively, the light sources 40 or 42 may be selected by a switch 23 on the exterior of the microscope 12, as shown in FIG. 1.

A white light emitting diode (LED) may be used as the white light source 40. Suitable diodes include indium gallium nitride (InGaN) diodes available, for example, from Nichia America Corporation (Mountville, Pa. 17554) including the Nichia NSPW500BS and NSPW300BS white light LEDs. See wwwla.meshnet.jp/nichia/lamp-e.htm. These devices show negligible emission in the infrared radiation spectrum (approximately 780 nanometers and higher). The chromaticity coordinates specified by the manufacturer for these diodes are X=0.310, Y=0.320 in the CIE (1931) standard calorimetric system (International Congress on Illumination, Proceedings, International Congress on Illumination, Cambridge, Cambridge University Press).

For the infrared source 42, a gallium aluminum arsenide (GaAlAs) infrared light emitting diode may be utilized. These diodes may emit radiation at wavelengths of about 875 nanometers. Alternatively, gallium arsenide (GaAs) diodes may be used that emit radiation at wavelengths of about 940 nanometers. Such diodes are available, for example, from Vishay Intertechnology Inc. (San Diego, Calif.). Examples of suitable diodes include the TSHA440 infrared light emitting GaAlAs diode from Vishay (www.vishay.de) emitting at 875 nanometers.

Imaging optics 30, which may be a spherical lens of the type used for macro photography, may be positioned between the object 38 and the imaging sensor 28. Its position may be manually adjustable using the rotatable knobs 18 to allow for focusing. In some cases, the spherical lens 30 may be replaced with a flat lens, such as Fresnel lens, adapted for close up viewing.

Since no infrared blocking filter is needed, optical efficiency and cost may be improved in some embodiments. Also, the reliability of LEDs is relatively high compared to filament lamps.

Figure 4:
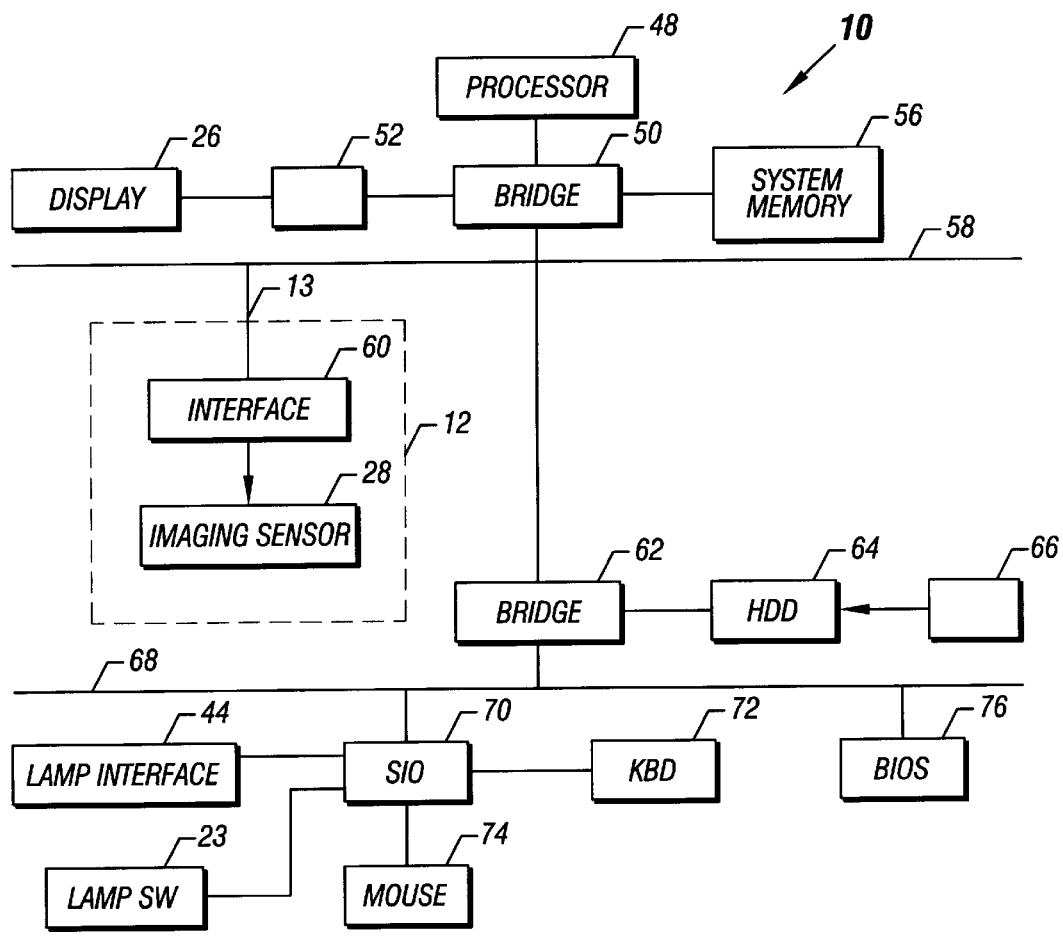
FIG. 4 is a block diagram of the system shown in FIG. 1.

One hardware implementation of the present invention, shown in FIG. 4, includes a processor-based system 10 having a processor 48 coupled to a bridge 50. The bridge 50 is coupled between system memory 56 and graphics accelerator 52. The display 26 may be coupled to the graphics accelerator 52.

The bridge 50 also couples a bus 58 in turn coupled to the microscope 12 through the cable 13 to the imaging sensor 28 and its interface 60. The interface 60 may itself include a processor for conducting analyses on digital representations of the image detected by the microscope 12. Alternatively, as shown in FIG. 4, the interface 60 may simply interface the imaging array 28 with the processor 48.

In one embodiment, a second bridge 62 couples a hard disk drive 64 or other non-volatile storage. The drive 64 may store image processing software 66 for modifying and enhancing the captured images, for example using the graphical user interface shown in FIG. 3.

The bridge 62 is also coupled to another bus 68 which couples conventional devices such as a keyboard 72 and a mouse 74 through a serial input/output (SIO) device 70. A binary input/output system (BIOS) 76 may also be coupled to the bus 68. The lamp interface 44 and lamp switch 23 may also be coupled through the SIO device 70.

Figure 3:
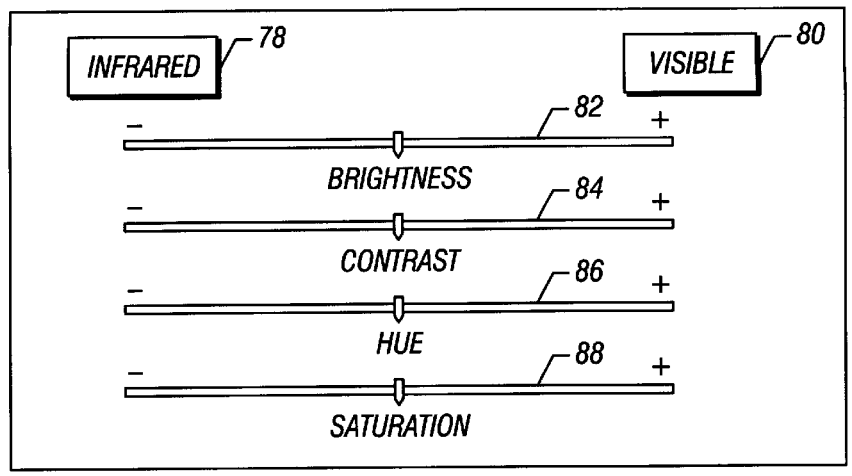
FIG. 3 is a graphical user interface that may be used in some embodiments of the present invention.

Referring to FIG. 3, a graphical user interface, developed by the processor 48 under control of the software 66, may be displayed on the display 26 to assist the user of the host computer system 22 in utilizing the microscope 12. For example, a pair of icons 78 and 80 may be displayed which the user may use to select either infrared or visible spectrum illumination. When the user operates the mouse cursor over the desired icon 78 or 80, the host computer 22 may select the appropriate illumination source 40 or 42.

Similarly, the user can make other image modifications including brightness adjustments as indicated at 82, contrast as indicated at 84, hue as indicated at 86 and saturation as indicated at 88. Each of these input icons, as well as others, may operate on a simple sliding scale where moving the icon to the right using a mouse cursor increases the characteristic and moving to the left decreases the characteristic. After the user has made the desired adjustments, the user can return to displaying the captured image of the object 38 by selecting an icon 78 or 80.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A microscope comprising:

an imaging array responsive to both visible light and infrared light;

a first light source to selectively produce visible light to illuminate said array; and a second light source independent from said first light source to selectively produce infrared light to illuminate said array.

2. The microscope of claim 1 including a cable for coupling said microscope to a computer.

3. The microscope of claim 1 wherein said first light source is a white light emitting gallium nitride diode.

4. The microscope of claim 1 wherein said second light source is an infrared emitting diode.

5. The microscope of claim 4 wherein said diode is a gallium aluminum arsenide diode.

6. The microscope of claim 4 wherein said diode is a gallium arsenide diode.

7. The microscope of claim 1 wherein said first light source is adapted to produce light outside the infrared spectrum and said second light source is adapted to produce light outside the visible light spectrum.

8. The microscope of claim 1 including a processor and an input device coupled to said processor, said processor programmed to allow the user to select the first or the second light source using said input device.

9. The microscope of claim 8 wherein said imaging array is coupled to said processor such that an image captured by said imaging array may be displayed on a display coupled to said processor.

* * * * *